United States Patent [19]

Komiyama et al.

[11] Patent Number: 4,627,534
[45] Date of Patent: Dec. 9, 1986

[54] MAGNETIC TAPE CASSETTE STORAGE CASE

[75] Inventors: Choji Komiyama; Osamu Suzuki, both of Kanagawa, Japan

[73] Assignee: Fuji Photo Film Co., Ltd., Kanagawa, Japan

[21] Appl. No.: 720,250

[22] Filed: Apr. 5, 1985

[30] Foreign Application Priority Data

Apr. 6, 1984 [JP] Japan .................................. 59-50298

[51] Int. Cl.⁴ .......................................... B65D 85/672
[52] U.S. Cl. .................................... 206/387; 206/309; 220/339
[58] Field of Search .............................. 206/309–313, 206/387; 220/334, 339; 229/44 R

[56] References Cited

U.S. PATENT DOCUMENTS

| 3,638,788 | 2/1972 | Solomon | 206/387 |
| 3,670,875 | 6/1972 | Jones | 206/334 |
| 3,744,703 | 7/1973 | Mortenson | 206/387 |
| 3,829,132 | 8/1974 | Willieme | 206/387 |
| 3,924,742 | 12/1975 | Primicerio et al. | 206/387 |
| 4,314,637 | 2/1982 | Posso | 206/387 |
| 4,365,711 | 12/1982 | Long et al. | 206/387 |

FOREIGN PATENT DOCUMENTS

| 2457094 | 1/1981 | France | 206/387 |
| 2477104 | 9/1981 | France | 206/387 |
| 2508221 | 12/1982 | France | 206/387 |
| 2072626 | 10/1981 | United Kingdom | 206/387 |

Primary Examiner—William Price
Assistant Examiner—Jimmy G. Foster
Attorney, Agent, or Firm—Sughrue, Mion, Zinn, Macpeak, and Seas

[57] ABSTRACT

A magnetic tape cassette storage case having a casing made up of a pocket for receiving the rear half of a magnetic tape cassette and a broad wall obtained by extending one wall of the pocket. A first cover, swingably connected to the pocket, has a first recess formed in its inner surface. A second cover, swingably connected to the broad wall, has a second recess formed in its inner surface. The first and second recesses receive the cassette's thicker portion in combination when the case is closed by the first and second cover. With the inventive case, the space required for storing the cases is smaller than that required for storing the same number of conventional ones.

2 Claims, 2 Drawing Figures

MAGNETIC TAPE CASSETTE STORAGE CASE

BACKGROUND OF THE INVENTION

The present invention relates to magnetic tape cassette storage cases, and more particularly to an improved magnetic tape cassette storage case of the type used to store an audio-type magnetic tape.

In general, a magnetic tape cassette used in an audio device or the like is stored in a cassette case made of plastic when not in use. A magnetic tape cassette has an opening into which the magnetic head, etc., of a magnetic tape recording and reproducing device are inserted, and includes a magnetic tape passing across the opening. The storage case is used to prevent the entrance of dust into the cassette through the opening, to protect the magnetic tape at the opening, and to protect the cassette as a whole.

The basic construction of a conventional magnetic tape cassette storage case is shown in FIG. 1. The case 1 includes a cover 2 with a pocket 4 into which a magnetic tape cassette 20 can be received, and a casing 5 having a pair of rotation preventing protrusions 7 which are inserted into the shaft insertion holes 22 of the magnetic tape cassette 20. The casing 5 has a pair of supporting shafts which extend from the inner surfaces of the right and left side walls thereof. The supporting shafts are engaged with a pair of through-holes formed in the right and left side walls of the pocket 4 so that the cover 2 can be swung like a door to close the casing 5.

The storage case 1 is formed so that the distance between the walls 3 and 6, which confront the front and rear surfaces of the magnetic tape cassette 20, respectively, corresponds to the thickness of the thicker portion 21 of the magnetic tape cassette 20. Accordingly, the thickness 1 of the storage case 1 must be much larger than the thickness 2 of the remaining portion of the cassette 20. Therefore, the space occupied by the storage case 1 is much larger than the space occupied by the magnetic tape cassette alone.

For this reason, to reduce the amount of space needed for storage (such as in an automobile), the user may not put the magnetic tape cassettes in the storage cases 1. However, if magnetic tape cassettes are stored without being encased, dust can readily accumulate inside the cassettes, adversely affecting the recording and reproducing characteristics of the cassettes.

SUMMARY OF THE INVENTION

In view of the foregoing, an object of the present invention is to provide a magnetic tape cassette storage case which occupies a smaller space than a conventional magnetic tape cassette storage case.

The foregoing object and other objects of the invention have been achieved by the provision of a magnetic tape cassette storage case which, according to the invention, comprises a casing having a pocket into which the rear half of a magnetic tape cassette is inserted; a wide wall which is formed by extending one wall of the pocket in such a manner that the one wall of the pocket in such a manner that the one wall confronts the front or rear surface of the magnetic tape cassette; a first cover having a pair of rotation preventing protrusions which are inserted into reel shaft insertion holes, and a recess for receiving a cassette's thicker portion, the first cover being swingably connected through a hinge to the pocket; and a second cover having another recess for receiving the cassette's thicker portion, the second cover being swingably connected through a hinge to the wide wall, the first and second covers having locking parts which are engaged with each other to close the storage case.

The nature, principle and utility of the invention will become more apparent from the following detailed description when read in conjunction with the accompanying drawings.

DESCRIPTION OF THE PREFERRED EMBODIMENTS

Figure 1:
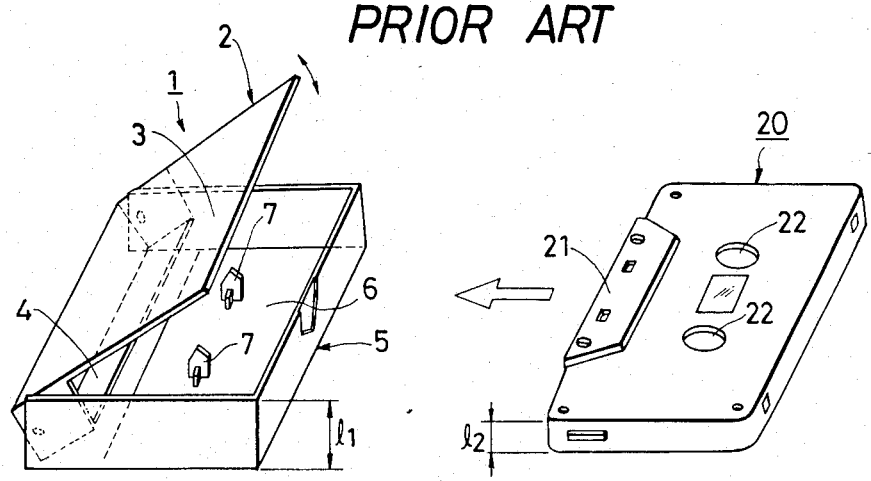
FIG. 1 is a perspective view showing a conventional magnetic tape cassette storage case.
Figure 2:
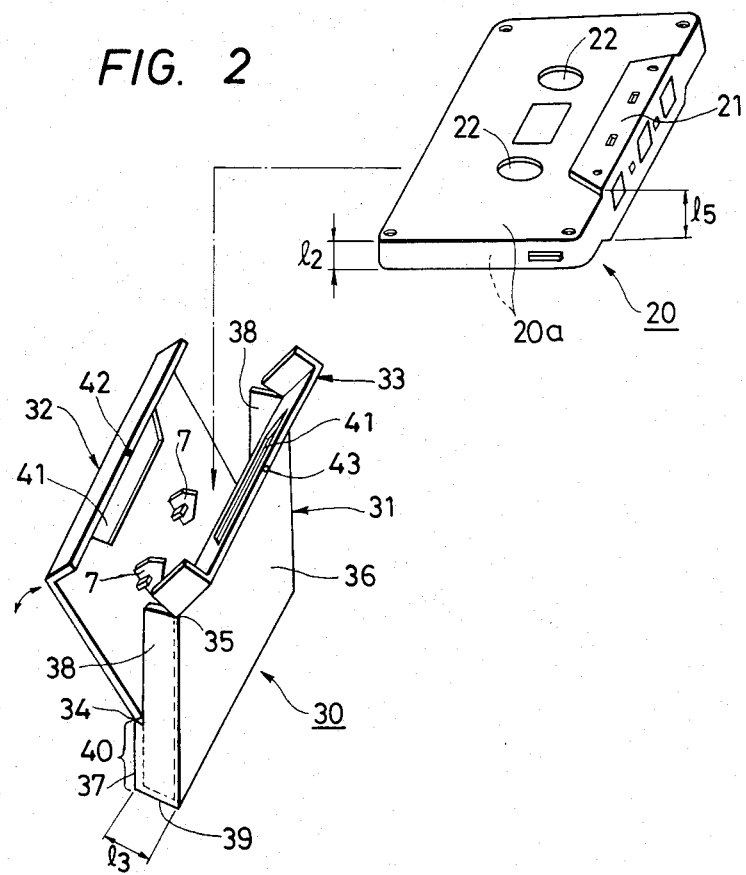
FIG. 2 is a perspective view showing an example of a magnetic tape cassette storage case constructed according to the invention.

As shown in FIG. 2, a magnetic tape cassette storage case 30 according to the invention includes a casing 31, a first cover 32, and a second cover 33. The first cover 32 is made integral through a first hinge 34 with the casing 31, and the second cover 3 is made integral through a second hinge 35 with the casing 31.

The casing 31 is made up of a wide wall 36 and a narrow wall 37 which confronts the front and rear surfaces 20a of a magnetic tape cassette, right and left side walls 38 which confront the right and left side surfaces of the cassette, and a bottom wall 39. These walls form a pocket 40 adapted to receive the rear half of the cassette.

The first cover 32 is swingably connected through the hinge 34 to the narrow wall 37. A recess 41, trapezoidal in shape, for instance, for receiving the thicker portion 21 of the magnetic tape cassette 20 is formed in the inner surface of the first cover 32. Furthermore, a pair of rotation preventing protrusions 7 are provided on the inner surface of the first cover 32. The free end portion of the first cover 32 forms right angles with respect to the major portion thereof, and has a width equal to that of the bottom wall 39. The free end portion has a cut 42 is engaged with a protrusion 43 (described below) when the casing is closed.

The second cover 33 is swingably connected through the hinge 35 to the wide wall 36 of the casing. The right and left end portions of the second cover 33 are bent to meet the right and left side walls 38, respectively, described above. Another recess 41, which is similar to the aforementioned recess 41 and which confronts the latter, is formed in the inner surface of the second cover 33. The second cover 33 has the abovedescribed protrusion 43 at the center of its longer edge. The protrusion 43 is engaged with the cut 42, as described above.

When the case 30 is closed, the distance between the wide wall 36 and the first cover 32 or the narrow wall 37 is slightly greater than the thickness $l_2$ of the major portion of the magnetic tape cassette 20, which is other than the cassette's thicker portion 21, and the distance between the walls of the two recesses 41 is slightly larger than the thickness $l_5$ of the cassette's thicker portion 21.

The storage case 30 may be made of a plastic resin such as polypropyrene or polycarbonate; however, it is desirable to use for the material of the case 30 a material with a good fatigue withstanding strength for forming the hinges 34 and 35.

The first and second hinges 34 and 35 may be formed along the entire edges of the narrow and wide walls 37 and 36, respectively, or they may be formed only along the middle parts of the edges.

In order to place the magnetic tape cassette 20 in the storage case 30 thus constructed, the case 30 is opened by swinging the two covers 32 and 33, and then the rear half of the magnetic tape cassette 20 (which is opposite to the opening in the cassette 20) is inserted into the pocket 40. Thereafter, the case 30 is closed by swinging back the two covers 32 and 33, whereupon the protrusion 42 is engaged with the cut 42 so that the case 30 cannot easily be unintentionally opened. When the storage case 30 is closed as described, the recesses 41 receive the cassette's thicker portion 21 while the rotation preventing protrusions 7 are inserted into the reel shaft insertion holes 22 to prevent the rotation of the hubs on which the magnetic tape is wound.

As is apparent from the above description, in the magnetic tape cassette storage case of the invention, the recesses 41 are formed in the inner surfaces of the two covers 32 and 33 to receive the cassette's thicker portion 21 so that the distance between the wide wall 36 and the first cover 32 or the narrow wall 37 is made nearly equal to the thickness $l_2$ of the major portion of the cassette which is other than the cassette's thicker portion 21. Therefore, the thickness of the case 30 is smaller as a whole than that of the conventional case; that is, the space required for storing the cases of the invention is smaller than that required for storing the same number of conventional cases.

Furthermore, the storage case of the invention can be molded as a single unit. Accordingly, the manufacture of the case of the invention, unlike that of the conventional one, requires no assembly steps, and thus the case of the invention is superior to the conventional one in productivity.

We claim:

1. A magnetic tape cassette storage case, comprising:
   a casing having a pocket into which a rear half of a magnetic tape cassette may be inserted, and a wide wall formed by extending one wall of said pocket in such a manner that said one wall will confront one of a front and rear surface of said magnetic tape cassette;
   a first cover having a pair of rotation preventing protrusions insertable into reel shaft insertion holes of said magnetic tape cassette and a recess for receiving a thicker portion of said magnetic tape cassette, said first cover being swingably connected through a hinge to said pocket;
   a second cover having another recess for receiving said cassette's thicker portion, said second cover being swingably connected through a hinge to said wide wall; and
   said first and second covers having locking parts which are engaged with each other to close said cassette storage case.

2. The magnetic tape cassette storage case of claim 1, wherein said case is molded as an integral unit.

* * * * *